Feb. 20, 1968     P. E. WRAY     3,370,112
PROCESS AND APPARATUS FOR PRODUCING PLASTIC MEMORY ARTICLES
Filed Sept. 26, 1963     2 Sheets-Sheet 1
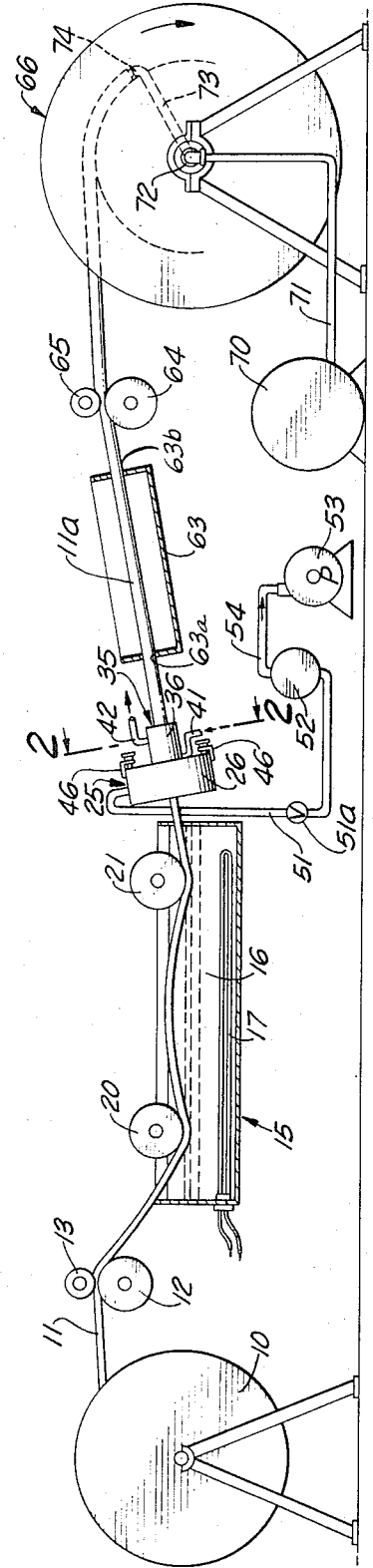
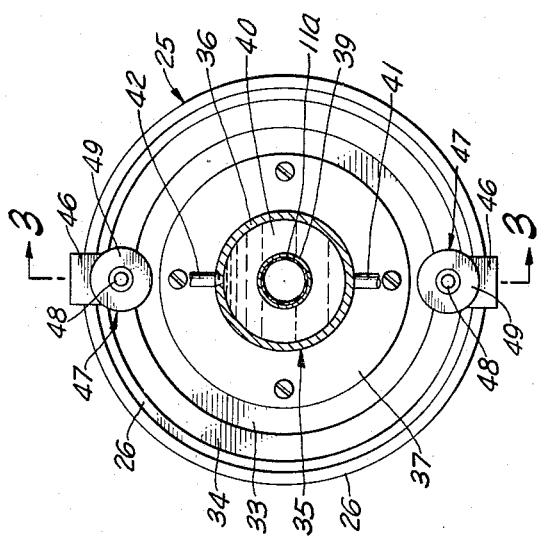
INVENTOR
PIERRE EDWARD WRAY
BY
ATTORNEYS

INVENTOR.
PIERRE EDWARD WRAY
BY
ATTORNEYS

United States Patent Office 3,370,112
Patented Feb. 20, 1968

3,370,112
PROCESS AND APPARATUS FOR PRODUCING
PLASTIC MEMORY ARTICLES
Pierre Edward Wray, San Carlos, Calif., assignor to Raychem Corporation, Redwood City, Calif., a corporation of California
Filed Sept. 26, 1963, Ser. No. 311,715
15 Claims. (Cl. 264—22)

This invention relates to the treatment of polymeric materials and has particular reference to the treatment of plastic articles to impart plastic memory characteristics thereto so as to provide products which retain their form and dimensions under low or normal temperature conditions, but which upon heating to a critical temperature change their form and return to their pre-treatment form and dimensions.

This invention is an improvement upon that disclosed in Cook et al. Patent No. 3,086,242. As disclosed in said patent, extruded crystalline polymers, extruded cross-linked crystalline polymeric materials and extruded parts containing appreciable quantities of such polymers or polymeric materials, when heated to a temperature above the crystalline melting point or range, behave as true elastomers, and, even more important, they exhibit under cooling through the crystalline melting range an extension in size even though the specific volume decreases. This extension in size can be of the order of 400 to 800 percent, which is much greater than can be accomplished by simply expanding in the molten (amorphous) state.

This extension phenomenon can best be illustrated by citing as an example the synthesis of heat-shrinkable tubing from a crystalline cross-linked polymer. The tubing is first extruded using any conventional type extruder. In extrusion processes, it is known that there is a degree of orientation (molecular displacement) which results from the shearing forces, pull, etc., during extrusion. Said tubing, when heated above the crystalline melting range, will exhibit a retraction due to the release of the "frozen-in" strains which were introduced in the material by the extrusion process. The degree of shrinkage will depend, of course, upon the degree of orientation. When said tubing is subjected to a sufficient irradiation dose (a minimum of $2 \times 10^6$ rads) or chemically cross-linked to a minimum state equivalent to that resulting from a minimum irradiation dose of $2 \times 10^6$ rads, the "frozen-in" strains (orientation) are locked into the structure due to the formation of primary valence bonds (cross-links). When said tubing is then heated above the crystalline melting range, much less retraction occurs, depending upon the degree of cross-linking. Thus, the material remains oriented. While the application of sufficient pressure inside the tubing in its elastic state will expand the tubing, it is possible to apply pressure and not expand the tubing. Subsequently, controlled cooling of the tubing through the crystalline melting range while still pressurized causes the tubing to expand. It is hypothesized that this expansion is due to the crystallization of the oriented polymer which causes the crystals to assume a preferred orientation. Thus, it is envisioned that as the temperature is lowered through the crystalline melting range, the crystalline structure literally "snaps into place," this being a preferred orientation due to the beforementioned original "frozen-in" strain. It is believed that the amount of orientation necessary to produce the extension effect is a function of several variables such as type of polymer, molecular weight, amount of irradiation, temperature, etc. It is, therefore, difficult to define and measure the amount of orientation (molecular displacement) necessary to produce the extension phenomenon, but the orientation produced by conventional extrusion techniques is adequate for such production.

As was previously stated, certain crystalline polymers will also exhibit this phenomenon if at some temperature at or above their crystalline melting range they behave as elastomeric materials for a period of time even though this be of short duration. It is believed that essentially non-polar high molecular weight polymers which possess appreciable strengths at elevated temperatures, and other polymers which exhibit strength at high temperatures due to stronger bonding, hydrogen bonding, dipole-dipole attraction, etc., behave similar to cross-linked crystalline polymers. In general, then, any crystalline polymer which has sufficient strength and is elastomeric at elevated temperature will exhibit the beforementioned extension phenomenon. Thus, for example, it has been found that a heat-shrinkable tubing can be made from extruded polytetrafluoroethylene. In this instance, heating does not release the "frozen-in" strains because of the melt strength of the polymer. Therefore, in cooling polytetrafluoroethylene tubing through the crystalline melting range of the polymer in a pressurized system the same phenomenon of extension occurs. Again, it is believed that this extension is due to the crystallization of the extruded polymer which causes the crystals to assume a preferred orientation.

The specific process and apparatus illustrated in said Cook et al. Patent No. 3,086,242 has proven successful in actual commercial operation, but the closed, pressured tank system therein described for application of the necessary pressure differential to produce the desired expansion possesses certain inherent disadvantages. Among these are the necessity for careful fitting of the outlet aperture or sealing die to the particular tubing being processed in order to produce unstretched tubing; the inability of the operator to observe the tubing while it is in the tank, thus leading to potential control problems; the heavy construction of the pressurized tank which results in time-consuming opening and closing operations; the relatively slow response to adjustments in air pressure; and the difficulty in quick and easy adjustment of the cooling die. A primary object of the present invention is, therefore, to provide an improved process and apparatus which are not subject to the above and other disadvantages of the processes and apparatus used heretofore in the continuous production of articles having plastic memory characteristics.

Another object of the present invention is to provide a novel and improved process for producing articles of crystalline or cross-linked crystalline polymeric materials, such articles having plastic memory characteristics, said process utilizing the above-described extension phenomenon.

Another object of this invention is to provide a novel and improved continuous process for the production of articles of crystalline or cross-linked crystalline polymeric materials, said articles being in the form of heat-shrinkable tubing.

It is, of course, also possible to employ the beforementioned process to produce heat-shrinkable articles in forms other than tubing. Heat-shrinkable caps, splice closures, etc., are among those structures which can be made by this invention, and it is an object of this invention to provide a novel and improved process for the production thereof.

A further object of the present invention is to provide a novel and improved process for the production of radially heat-shrinkable but axially heat-stable tubes of polymeric material.

Still another object of this invention is to provide novel apparatus for carrying out the process of the present invention.

Other objects and advantages of this invention will become apparent from the following detailed description taken in connection with the accompanying drawings, wherein are set forth by way of illustration and example certain embodiments of this invention.

In the drawings:

FIGURE 1 is a side elevation, partly in section, of an apparatus used in carrying out the invention.

FIGURE 2 is a sectional view taken substantially on the line 2—2 of FIGURE 1.

Figure 3:
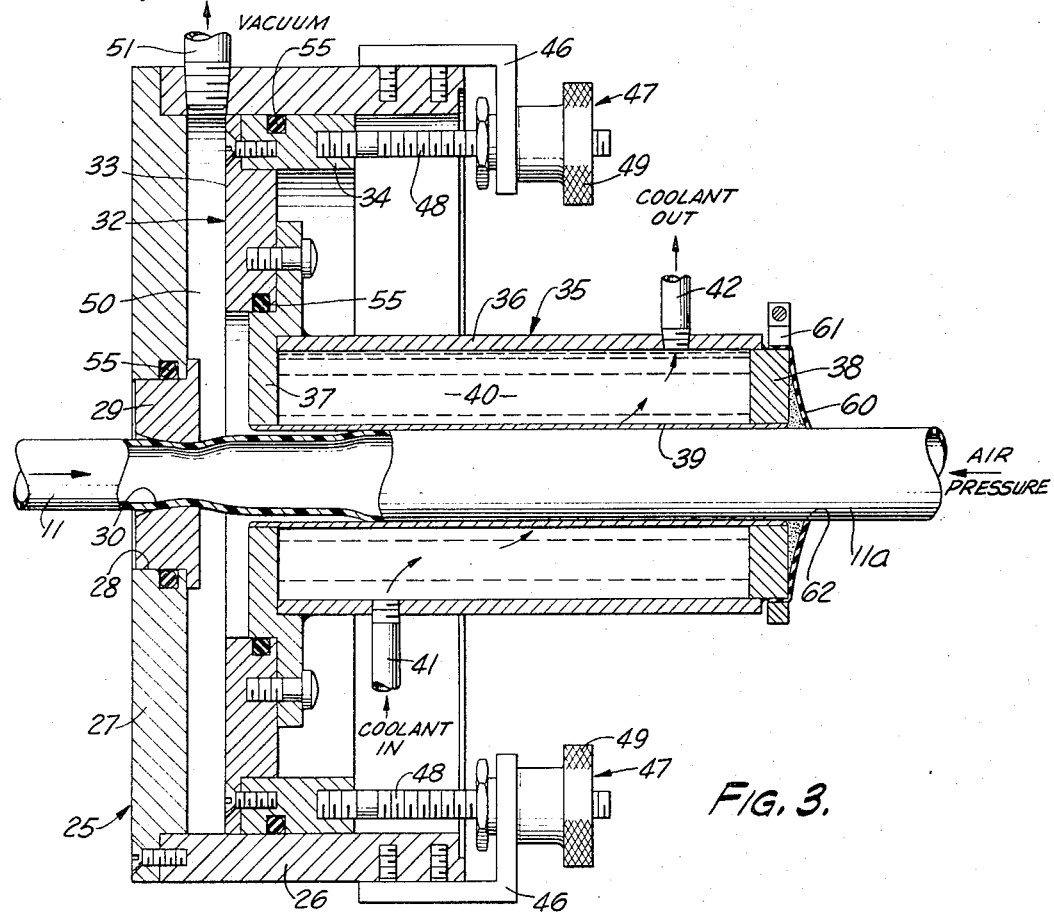
FIGURE 3 is a sectional view taken substantially on the line 3—3 of FIGURE 2.

The process of the present invention, as applied to the production of heat-shrinkable tubing, includes the steps of: (1) passing a tube of crystalline or cross-linked crystalline polymeric material through a heating zone open to atmosphere to heat the tube to an elevated temperature equal to or above its crystalline melting temperature or range so as to melt the crystals in the material: (2) while the tube is at said temperature, imparting a pressure differential between the inside and outside of the tube by passing the tube through a zone of partial vacuum, the pressure differential due to the partial vacuum being insufficient to bring about a change of dimensions of the tube equal to the desired, predetermined change of dimensions while the tube is at a temperature in excess of the crystalline melting temperature or range, but being sufficient to cause an appreciable and predetermined change of dimensions when the tube is cooled through the crystalline melting range of the polymers; (3) then passing the tube through a cooling zone to cool the tube to a temperature below the crystalline melting temperature or range, while maintaining the pressure differential so as to set the tube at its changed and predetermined dimensions. Preferably, throughout the entire process, super-atmospheric pressure is applied to the interior of the tube.

Referring now to the drawings, the apparatus shown therein is designed to carry out the process of the present invention as applied to the treatment of irradiated polyethylene tubing to continuously produce a heat-shrinkable polyethylene tubing. As shown, the apparatus includes a supply reel 10 of tubing 11, a drive capstan 12 and an idler roll 13, the tubing 11 being thereby driven into an open heating tank 15. A supply of a suitable liquid bath 16 such as oil or the like is provided in the tank 15, the bath being heated by means of thermostatically-controlled immersion heaters 17. The tubing, as it passes through the tank is immersed in the bath by means of a pair of rolls 20 and 21.

Mounted adjacent the end of the tank 15 is the expansion assembly, generally indicated 25 in FIGURE 1. As shown best in FIGURES 2-4, this assembly includes a cylinder 26 having an end wall 27 provided with a central opening 28 in which is removably secured a sealing die member 29 provided with a central die orifice 30 suitably dimensioned and shaped, with respect to the particular tubing diameter being operated upon, to form therewith a pressure seal. Mounted within the cylinder is a piston member 32 which includes a ring 33, a cylindrical wall member 34 being secured thereto. Secured to the ring 32 and forming a part of the piston member is a cooling die 35, comprising a cylinder 36, a centrally-apertured front end wall 37, a centrally-apertured rear end wall 38, and an inner, relatively thin-walled die cylinder 39, properly sized to the final predetermined expanded diameter of the tubing. From this description it will be understood that the cylinders 36 and 39 and the end walls 37 and 38 form an annular coolant chamber 40, inlet and outlet fixtures 41 and 42 being provided for the circulation therethrough of a suitable coolant such as water.

Means are provided for adjusting the spacing between the piston member 32 and the end wall 27, and as shown in the drawings, these means may include a pair of bracket members 46 carrying adjustment screw assemblies 47, each including an adjustment screw 48 secured to the cylinder 34, and an adjustment knob 49.

Means are provided for imposing a partial vacuum upon the chamber 50 formed between the front end of the piston member 32 and the end wall 27, and as shown in the drawings, these means include a vacuum line 51 having a valve 51a communicating with the chamber 50 and with a vacuum surge tank 52, the surge tank being connected to a vacuum pump 53 by means of the line 54.

Means are provided for sealing the chamber 50, and in addition to the sealing die 29 previously described, these means include a plurality of "O"-rings 55. The sealing means also include a relatively thin diaphragm 60 of rubber or rubber-like material, the diaphragm being secured to the rear end wall 38 by means of a clamping member 61, and being provided with a central opening 62 of a diameter slightly less than the expanded tubing 11a.

A tank 63 is provided for containing a cooling and rinsing bath, suitable inlet and outlet openings 63a and 63b permitting passage of the expanded tubing 11a through the tank. A drive capstan 64 and idler roll 65 is provided for pulling the expanded tubing through the apparatus, the tube then being wound upon a take-up reel 66.

Means are provided for introducing air at the desired pressure into the interior of the tubing, and as shown, these means may comprise an air surge tank 70 from which air is supplied through the line 71 and a rotary union 72 to a line 73 adapted to rotate with the reel 66 and connected to the expanded tubing at 74. Suitable valve means (not shown) are provided for controlling the supply of air to the tubing.

Means are provided for controlling the speed of travel of the tubing and for controlling the relative rates of speed of the tubing 11 and expanded tubing 11a. Thus, the roll 21 and capstan 64 are driven at the same speed by means of a variable speed motor and transmission (not shown), and the drive for the capstan 12 and roll 20 derives from the same source through a variable pulley assembly (not shown), so that the capstan 12 and pulley 20 are each driven at the same speed, but permitting the speed of the capstan 12 and roll 20 to be varied relative to the speed of the roll 21 and capstan 64.

Figure 4:
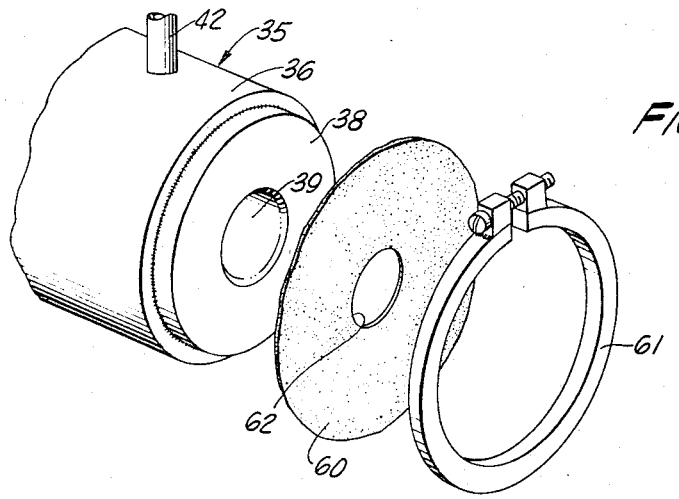
FIGURE 4 is a fragmentary, exploded perspective view of the cooling die sealing assembly.

In carrying out the process of the present invention, the tubing 11 is continuously taken from the supply reel 10 by means of the capstan 12 and fed through the heating bath 16 wherein the tubing is heated to the desired temperature for expansion. The tubing then enters the expansion assembly 25 through the sealing die member 29. It will be understood that air under pressure is continuously being fed into the interior of the tubing from the tank 70 and at the same time the interior of the expansion assembly, including the chamber 50, is maintained under a condition of reduced pressure. The pressure differential between the inside and outside of the tubing thus set up is sufficient to expand the tubing to the final predetermined diameter of the expanded tubing 11a as the tubing is cooled through the crystalline melting range, but this pressure differential is insufficient to bring about this degree of expansion while the tubing is at a temperature above its crystalline melting temperature or range. However, preferably the pressure differential is sufficient to cause a small amount of expansion, as indicated in FIGURE 3, merely to insure a satisfactory seal between the tubing and the sealing die 29. That is, the air pressure within the tubing is sufficient to cause a slight amount of expansion of the tubing in the bath 16 so that the tubing as it passes through the sealing die 30 is slightly expanded and, as the tubing enters the chamber 50 the tubing is further expanded an additional slight amount, due to the increased pressure differential. Finally, as the tubing progresses further into the expansion assembly it begins to cool down through the crystalline melting temperature and this expansion continues to the final predetermined diameter wherein the expanded tubing 11a contacts the inside surface of the cooling die 39. The pressure differential is just sufficient to bring the tubing into contact with the cooling die surface and at that point the tubing has been cooled to below the crystalline melting temperature so that the tubing diameter is in the final, set condition. It is, of course, understood that a different size cooling die 39 must be used for each final diameter of tubing processed.

The expanded tubing passes from the expansion assembly into and through the final cooling and rinsing bath in the tank 63, from which it is reeled upon the take-up reel 66.

In most cases, it is desired to produce tubing which is heat-shrinkable in the sense of being capable of shrinking radially, but exhibiting little or no longitudinal shrinkage upon the application of heat in use. This is accomplished in the process of the present invention by proper control of the relative speeds of travel of the tubing during the heating in the tank 15 and during the expansion operation, and also by proper control of the expansion pressure differential so as to minimize the amount of friction between the expanded tubing and the surface of the cooling die. Thus, in normal operation, the speed control means for the capstans 12 and 64 and the respective rolls 20 and 21 are initially adjusted to assure that the speed of travel of the unexpanded tubing in the tank 15 ahead of the roll 21 is sufficiently greater than that of the tubing between the roll 21 and the capstan 64, that no tension is applied to the unexpanded tubing in the tank. Preferably the relative speeds are such that the tubing in the tank is in a slack condition so that the portion of the tubing between the rolls 20 and 21 actually floats to the surface of the heating liquid 16. The tubing is thus free to shrink-back a small amount, due to relieving of the "frozen-in" strains originally introduced by the extrusion process and not "locked-in" by the cross-linking operation.

Further control to minimize longitudinal shrink-back in the final product is accomplished by proper control of the expansion differential pressure, as by manipulation of the valve 51a in such a manner as to minimize the friction between the expanded tubing and the cooling die surface, it being understood that excessive friction can result in undesirable longitudinal stretching of the tubing while it is being expanded radially. Since the roll 21 and capstan 64 always rotate at the same speed, it will be understood that excessive differential pressure will increase the frictional contact between the expanded tubing and the cooling die surface to a point where the tubing will tend to back up between the roll 21 and the sealing die 29. Accordingly, the operator can visually observe the tubing as it passes between the roll 21 and sealing die 29, and can make appropriate adjustments of the valve 51a in the event such build-up occurs.

The following specific examples illustrate the process of the present invention, but it is to be understood that the invention is not to be limited to the specific details thereof:

EXAMPLE I

The polyethylene tubing utilized was a modified polyethylene extruded to an inside diameter of 0.098–0.104 inch and a wall thickness of 0.014–0.0117 inch. The weight composition of the extruded material was 81.5% RULAN 2 NC–10 (DuPont), a modified, flame-retarded polyethylene, 18.0% BAKELITE DFD 6005 polyethylene (Union Carbide Plastics Co.), and 0.5% 4,4'-butylidenebis (6-tert-butyl-m-cresol) antioxidant. The extruded tubing was irradiated to approximately 35 megarads and then expanded in the apparatus and in accordance with the process described above. The heating bath temperature was 255° F., the internal air pressure was 9.6–10 p.s.i.g., the vacuum pressure in the expansion assembly was 10.4–11 inches Hg and the tubing running speed was approximately 15 feet per minute. The sealing die 29 had a minimum diameter of 0.158 inch and the cooling die 30 an inside diameter of 0.233 inch. The expanded inside diameter of the tubing 11a was 0.195–0.203 inch and the wall thickness thereof was 0.011–0.014 inch. Samples of the finished product were heated to 255° F., exhibiting less than 2% axial or longitudinal shrinkage, but with complete shrink-back to the initial unexpanded diameter.

EXAMPLE II

The process of this example was the same as that set forth in Example I above, except that the tubing was clear extruded material comprising a medium molecular weight low density polyethylene (Monsanto 12253) plus 0.5% 4,4' thiobis (6-tert-butyl-m-cresol) antioxidant, and the unexpanded inside diameter and wall thickness was 0.158–0.162 inch and 0.017–0.021 inch, respectively. The internal air pressure was 6.5–7 p.s.i.g., the vacuum pressure was 70 inches Hg, the running speed was from 8 to 20 feet per minute, the sealing and cooling die diameters were 0.271 inch and 0.359 inch, respectively, and the expanded inside diameter and wall thickness were 0.315–0.320 inch and 0.013–0.017 inch, respectively. The axial shrinkage of samples of the finished product heated to 255° F. was between 0 and 6%.

EXAMPLES III–VII

The processes of these examples were carried out in the same manner as described in connection with Example I, with the exceptions noted below, and the results are set forth in the following table:

TABLE FOR EXAMPLES III–VII

| Ex. No. | Tubing Dimension Ranges, Inches | | | | Axial Shrinkage, percent | Operation Conditions | | | | Tooling Dimensions, Inches | |
|---|---|---|---|---|---|---|---|---|---|---|---|
| | Unexpanded | | Expanded | | | Tank Temp., °F. | Air, p.s.i.g. | Vacuum, Inches Hg | Run Speed, f.p.m. | Sealing Die | Cooling Die |
| | Inside Diameter | Wall Thickness | Inside Diameter | Wall Thickness | | | | | | | |
| III | 0.095–0.100 | 0.016–0.020 | 0.193–0.200 | 0.013–0.020 | 6 | 265 | 11.5–12 | 13.5–14 | 27 | 0.158 | 0.233 |
| IV | 0.108–0.110 | 0.027–0.030 | 0.270–0.280 | 0.014–0.017 | 6 | 320 | 5.0–5.3 | 10–11 | 6 | 0.231 | 0.300 |
| V | 0.460–0.465 | 0.074–0.079 | 1.010 1.020 | 0.036–0.042 | 10–12 | 340 | 11.5–12 | 12–15 | 3 | 0.740 | 1.165 |
| VI | 0.462–0.470 | 0.079–0.084 | 0.980–0.990 | 0.037–0.045 | 10–12 | 345 | 7.0–7.2 | 11–12 | 3.5 | 0.740 | 1.165 |
| VII | 0.093–0.096 | 0.023–0.025 | 0.260–0.265 | 0.011–0.013 | 15 | 320 | 9.0–9.5 | 14–15 | 6 | 0.231 | 0.300 |

The tubing of Example III was a pigmented (white), flame retarded polyethylene containing a major proportion of Bakelite DYNK (Union Carbide Plastics Co.) and was irradiated to approximately 25 megarads. The tubing of Example IV was another modified white, flame retarded polyethylene material containing a major proportion of an equal-part blend of Hi-fax 1400E (Hercules Powder Co.) and Spencer 2504 (Spencer Chemical Co.), the tubing being irradiated to approximately 15 megarads. The tubing of Example V was a modified, cross-linked neoprene rubber, that of Example VI was a modified, cross-linked silicon rubber, the products of these two examples comprising heat-shrinkable elastomeric tubing. The tubing of Example VII was a black polyvinyl chloride composition irradiated to approximately 5 megarads.

The process and apparatus of the present invention are particularly advantageous for a number of reasons. The light, open tank construction permits complete visibility of the tubing entering the critical expansion area thus permitting excellent control of elongation of the product during expansion. Quick response to adjustment of the expansion forces are obtained in that only a relatively small volume of air (that inside the tubing) requires pressure adjustment, and the vacuum can be virtually instantaneously adjusted by opening or closing the vacuum system to atmosphere. The use of the partial and controllable vacuum as the means of obtaining the required pressure differential permits variation in the internal air pressure in the tubing, thus accommodating variations in tubing dimensions as are usually permitted by tolerances in existing specifications for extruded tubing. The specific structure of the expansion assembly provides for proper alignment of the sealing and cooling dies and for adjustment of the spacing between the dies as dictated by variations in tubing materials and sizes.

Having fully described my invention, it is to be understood that I do not wish to be limited to the details set forth but my invention is of the full scope of the appended claims.

I claim:

1. A process for the production of heat-shrinkable tubing having a predetermined diameter from an extruded tube of crystalline polymeric material, said material exhibiting elastomeric properties when heated to a temperature at least equal to its crystalline melting temperature, said process comprising heating said tube to a temperature at least equal to the crystalline melting temperature of said material, said heating step being carried out with the exterior of the tube exposed to atmospheric pressure, establishing a pressure differential between the inside and outside of said tube by imposing a partial vacuum on the exterior of the tube, said pressure differential being less than that required to expand the tube to the final predetermined diameter while it is at said temperature, but being sufficient to expand the tube to the final predetermined diameter upon cooling the tube to a temperature below said crystalline melting temperature, and cooling the tube to a temperature below said crystalline melting temperature while continuing to maintain said pressure differential until said tube is set at the desired predetermined expanded diameter.

2. The process of claim 1, wherein super-atmospheric pressure is applied to the interior of said tube.

3. The process of claim 1, wherein said crystalline polymeric material is produced by cross-linking a crystalline polymer by means equivalent to an irradiation dose of at least about $2 \times 10^6$ rads.

4. The process of claim 1, wherein said cross-linked crystalline polymeric material is produced by subjecting a crystalline polymer to an irradiation dose of at least about $2 \times 10^6$ rads.

5. The process of claim 4, wherein the crystalline polymeric material is a polyolefin.

6. The process of claim 5, wherein the crystalline polymeric material is polyethylene.

7. The process of claim 1, wherein the crystalline polymeric material is polyvinyl chloride.

8. The process of claim 1, wherein the crystalline polymeric material is blended with an elastomer to produce an elastomeric tubing.

9. The process of claim 1, wherein the crystalline polymeric material is a modified, cross-linked neoprene rubber.

10. The process of claim 1, wherein the crystalline polymeric material is a modified, cross-linked silicone rubber.

11. The process of claim 1, wherein the tube is moved through a heating zone, and an expansion and cooling zone, the speeds of travel through said zones being controlled so that the length of the tube remains substantially unchanged throughout the process.

12. The process of claim 11, wherein the tube is fed to the heating zone at a rate faster than it is fed from said heating zone to the expansion and cooling zones.

13. The process of claim 1 wherein the final predetermined diameter is at least about twice the initial diameter.

14. The apparatus of claim 15, wherein said inlet opening is defined by a surface of circular cross-section axially aligned with said cylindrical surface, wherein said circular cross-section is slightly less in diameter than the diameter of said tubing prior to expansion, and wherein the diameter of said cylindrical surface is substantially the same as the final expanded diameter of said tubing.

15. Apparatus for producing heat-shrinkable tubing comprising an open vessel having a heating zone; means for conveying a length of tubing through said heating zone; means for applying heat to said heating zone; and an expansion assembly, said assembly comprising a cylinder having an end wall, said end wall having an inlet opening therein, a piston member operably connected to said cylinder, said piston member having an end wall spaced from said cylinder end wall and a cooling die positioned on said piston end wall, said cooling die having a cylindrical surface forming said outlet opening.

References Cited

UNITED STATES PATENTS

| | | | |
|---|---|---|---|
| 3,086,242 | 4/1963 | Cook et al. | 264—100 |
| 3,190,739 | 6/1965 | Wilson | 18—14 |
| 3,213,165 | 10/1965 | Pollock | 264—95 |

ALEXANDER H. BRODMERKEL, *Primary Examiner.*

F. S. WHISENHUNT, J. H. WOO, *Assistant Examiners.*